(12) United States Patent
Baur et al.

(10) Patent No.: US 11,505,953 B1
(45) Date of Patent: Nov. 22, 2022

(54) CONCRETE BEAM CONDUIT GUIDE

(71) Applicant: ConcreteVoids, LLC, Mohnton, PA (US)

(72) Inventors: Kenneth Charles Baur, Mohnton, PA (US); Michael Jeremy Baur, Pottstown, PA (US)

(73) Assignee: Concrete Voids LLC, Mohnton, PA (US)

( * ) Notice: Subject to any disclaimer, the term of this patent is extended or adjusted under 35 U.S.C. 154(b) by 107 days.

(21) Appl. No.: 16/862,872

(22) Filed: Apr. 30, 2020

(51) Int. Cl.
*E04G 15/06* (2006.01)
*H02G 3/22* (2006.01)

(52) U.S. Cl.
CPC .............. *E04G 15/061* (2013.01); *H02G 3/22* (2013.01)

(58) Field of Classification Search
CPC .......... E04G 15/061; H02G 3/22; H02G 3/28; E04B 5/48
See application file for complete search history.

(56) References Cited

U.S. PATENT DOCUMENTS

| | | | |
|---|---|---|---|
| 4,315,393 A | 2/1982 | Schack et al. | |
| 5,245,806 A | 9/1993 | Baur et al. | |
| 6,725,611 B2 | 4/2004 | DiFiglio | |
| 7,757,445 B2 | 7/2010 | Disterhof et al. | |
| 8,003,889 B2 | 8/2011 | Turcovsky | |
| 8,122,680 B2 | 2/2012 | Baur et al. | |
| 8,915,038 B1 | 12/2014 | Whitcomb, Sr. et al. | |
| 9,580,920 B1 * | 2/2017 | Yingling | E04G 15/061 |
| 2006/0096195 A1 * | 5/2006 | Zierer | E04G 21/30 52/220.1 |
| 2010/0243294 A1 * | 9/2010 | Ayme | H02G 3/22 174/153 R |
| 2014/0260013 A1 * | 9/2014 | de Freitas Silvestre | E04G 15/061 52/220.8 |
| 2016/0164270 A1 * | 6/2016 | Sims | H02B 11/26 174/50 |
| 2020/0041046 A1 * | 2/2020 | Karpel | H02G 3/088 |
| 2020/0343706 A1 * | 10/2020 | Stultz | B60R 16/0222 |
| 2020/0358276 A1 * | 11/2020 | Schonfeld | H05K 5/0217 |

* cited by examiner

*Primary Examiner* — Gisele D Ford

(74) *Attorney, Agent, or Firm* — Hooker & Habib, P.C.

(57) ABSTRACT

A conduit guide for a concrete beam construction that enables an MEP line to pass through the concrete beam includes a body defining a through passage, a securement panel in the passage, and a pair of sealing flanges on open ends of the body. The securement panel enables securement and/or alignment of an MEP line extending through the passage.

24 Claims, 6 Drawing Sheets

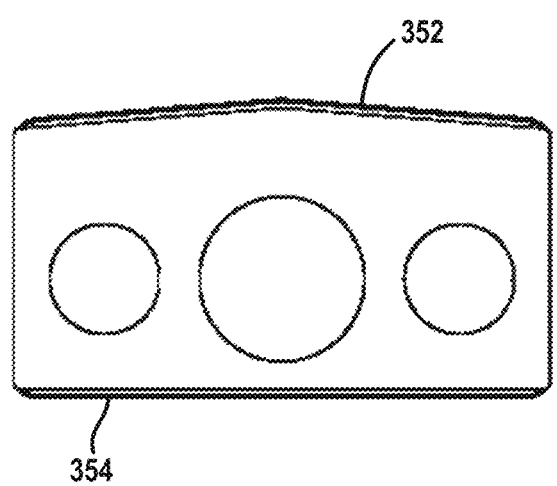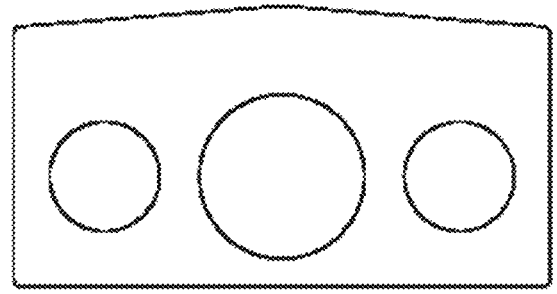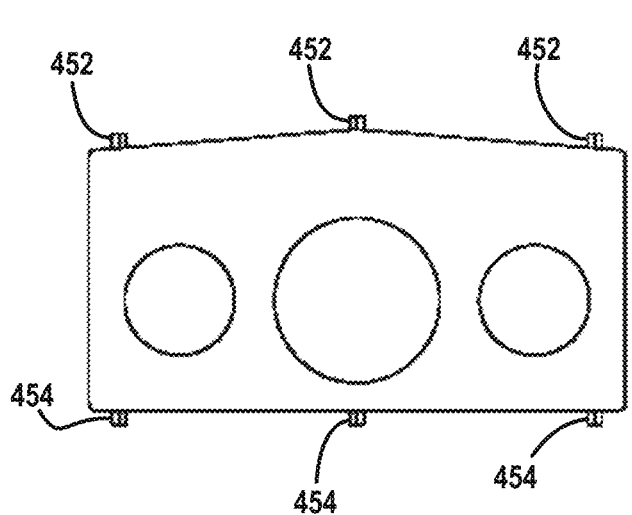
FIG. 10
FIG. 11
FIG. 12
FIG. 13
FIG. 14
FIG. 15

CONCRETE BEAM CONDUIT GUIDE

FIELD OF THE DISCLOSURE

The present disclosure relates to conduit guides that are cast in concrete beams, typically T-beams.

BACKGROUND OF THE DISCLOSURE

Baur et al. U.S. Pat. No. 5,245,806 incorporated by reference as if fully set forth herein discloses the concrete beam conduit guide A shown in FIGS. 20-22. The conduit guide includes a body B having a pair of sealing flanges C disposed on opposite ends D of the body.

The body B includes an unbroken tubular wall E extending from one end to the other end. The wall includes a roof R, opposite floor F, and opposing side walls S joining the roof and floor. The wall E defines a through passage P extending from the one end to the other end and includes an inside wall surface I facing and surrounding the passage.

Conduit guides are cast into T-beams. T-beams are commonly used, for example, in the construction of multi-floor parking garages. The conduit guide when cast into the T-beam facilitates feeding of lines and conduits and the like through the T-beams by passing them through the conduit guide passages.

Mechanical, electrical, and plumbing lines and conduits that pass through a conduit guide will be referred to as "MEP lines" herein. An MEP line can be a single mechanical line, electrical line, or plumbing line, or can be made of multiple mechanical lines, electrical lines, or plumbing lines arranged to extend as a unitary member through the conduit guide.

It may be desirable to secure and/or maintain alignment of an MEP line extending though a conduit guide. For example, building codes or technical standards may require that MEP lines be secured between spans of T-beams.

Yingling U.S. Pat. No. 9,580,920 discloses a conduit guide having a tubular body and a mounting member that is received in a wall opening of the tubular body. The mounting member holds mounting hardware that extends into the interior of the tubular body and holds an MEP extending through the tubular body. The wall opening must be covered during pouring of concrete around the conduit guide and it is inconvenient to stock and handle a separate mounting member.

BRIEF SUMMARY OF THE DISCLOSURE

Disclosed is a conduit guide for a concrete beam construction that enables an MEP line to pass through the concrete beam. The conduit guide includes a body, a securement panel, and a pair of sealing flanges. The securement panel enables securement and/or alignment of an MEP line extending through the disclosed conduit guide.

The body includes opposed open ends and a tubular wall extending from one end to the other end. The tubular wall in possible embodiments may be an unbroken wall without through-openings. The wall defines a through passage extending from the one end to the other end.

The securement panel is disposed in the body, the securement panel being fixedly attached to at least a portion of the wall surface and extending from the attachment into the passage and at least partially obstructing the passage.

The securement panel includes a through opening aligned with the passage that receives an MEP line extending through the conduit guide.

Embodiments of the securement panel include different panel and opening configurations.

In some embodiments, the securement panel completely obstructs the passage. An MEP line extending through the conduit must extend through the panel opening.

In other embodiments, the securement panel partially obstructs the passage. A gap is defined between the securement panel and the body wall. The gap in some embodiments is sized to enable a chain to pass through the passage for securing the concrete beam carrying the conduit guide during shipment, or can be used for passage of MEP lines that do not need to be secured. The gap in other embodiments is sized so that a cantilever-mounted panel is deflected by an MEP line extending through the gap. The deflected panel applies a force against the MEP line urging the MEP line against the body wall.

The opening in some panel embodiments is completely surrounded by a panel wall defining the opening. The opening wall limits relative movement of the MEP line towards the body wall and helps maintain alignment of the MEP line extending through the conduit guide. Embodiments of the wall opening may be provided with spring arms circumferentially spaced around the opening wall that extend into the opening. The spring arms are deflected by an MEP line extending through the opening, the spring arms applying a force against the MEP line resisting relative movement of the MEP line.

In yet other embodiments the panel opening is only partially surrounded by a panel wall. The opening wall cooperates with the body wall in resisting relative movement of the MEP line towards the body wall. In embodiments the opening wall is mounted at a free end of a cantilever-mounted panel. The panel is deflected by an MEP line extending through the opening, the deflected panel causing the opening wall to apply a force urging the MEP line against the body wall and resisting relative movement of the MEP line. In other embodiments the opening wall defines a gap between ends of the opening wall that receives an MEP line into the opening. The opening wall deflects to receive the MEP line and apply a retaining force against the MEP line. In variant embodiments fingers or arms disposed at the opening wall ends can be configured to assist securing the MEP line in the opening. Spring arms can also be circumferentially spaced along the opening wall that extend into the opening.

In embodiments of the securement panel, the securement panel includes a first panel portion fixedly attached to the body wall, and a second panel portion that is foldable along a fold line. The second panel portion can be folded relative to the first portion to define a gap between the securement panel and the body wall for passing a chain securing the concrete beam carrying the conduit guide during shipment. Once the concrete beam is installed, the second panel can be folded back to its original position during use. The first and second panel portions can be provided with fastening structure to receive fasteners that fasten together the first and second panel portions after the second panel portion is back to its original position.

In variant embodiments the second panel portion includes the opening and can be designed to be separated from the first panel portion. A differently configured second panel portion could then be attached to the first panel portion.

In yet other possible embodiments of the securement panel, the securement panel includes a first panel portion fixedly attached to the body wall. The user selects a second panel portion having the desired configuration and attaches it to the first channel portion prior to use. Second panel portions can be provided having different numbers of openings, relative positions of the openings, opening sizes, opening configurations (for example, with spring arms or without), panel sizes (for example, to fully obstruct or only partially obstruct the passage), mounting style (for example, cantilever mounted versus fixedly mounted) and the like to meet the needs of the user.

Or the user may elect not to install the second panel portion if it is not needed.

In embodiments the conduit guide is formed as a one-piece homogenous member, that is the body, the securement panel, and the pair of sealing flanges are formed as a one-piece member. The one-piece conduit guide may in embodiments be manufactured of plastic by injection molding and thus formed of an injection-moldable plastic.

The disclosed conduit guide has a number of advantages. The body has an unbroken outer wall so concrete cannot enter through an inadvertently left-open opening in the wall while still providing securement features. One-piece conduit guides can be stocked and inventoried the same as one-piece conduit guides without securement features. Different panel configurations can be provided for different user needs. And embodiments with removable or not initially attached second panel portions can be used without securement features if those features are not needed.

Other objects and features of the disclosure will become apparent as the description proceeds, especially when taken in conjunction with the accompanying drawing sheets illustrating one or more illustrative embodiments.

BRIEF DESCRIPTION OF THE DRAWINGS

FIGS. 10 and 11 are front and side views of a variant embodiment of a securement panel.

FIGS. 12 and 13 are front and side views of a second variant embodiment of a securement panel.

FIGS. 14 and 15 are front and side views respectively of a third variant embodiment of a securement panel.

DETAILED DESCRIPTION

FIGS. 1-8 illustrate six different embodiments of a conduit guide in accordance with this disclosure. Each conduit guide includes a tubular body defining a passage extending between open ends, a securement panel in the body, and sealing flanges disposed on opposite ends of the body. Each securement panel in the illustrated embodiments is located in the passage midway between the body ends. Only the securement panels differ among the embodiments. The same reference numbers are used in the figures for corresponding elements.

Figure 1:
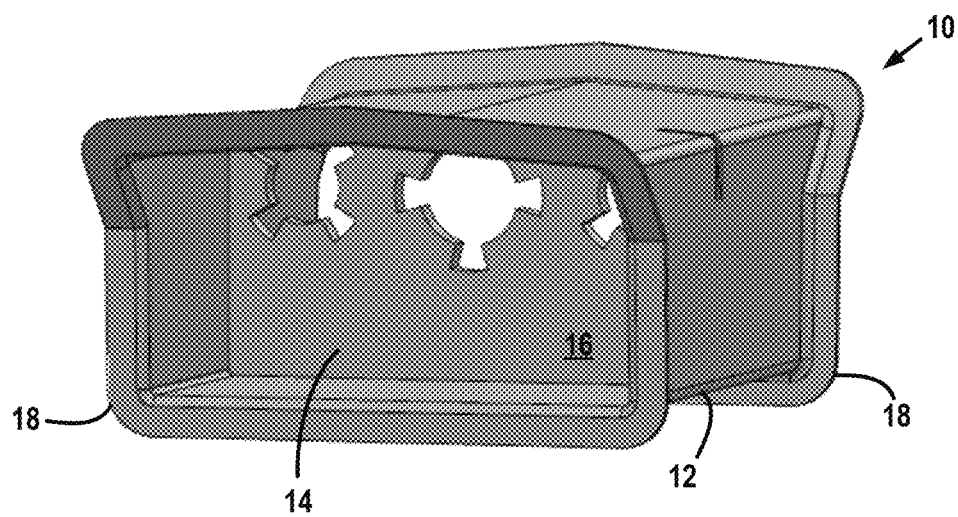
FIG. 1 is a side-end perspective view of a first embodiment conduit guide.
Figure 2:
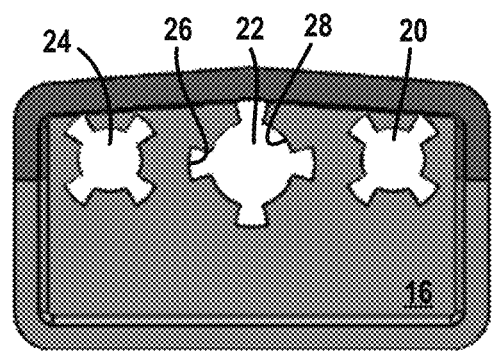
FIG. 2 is an end view of the conduit guide shown in FIG. 1.

FIGS. 1 and 2 illustrate a first embodiment conduit guide 10. The conduit guide includes a tubular hollow body 12 defining a passage 14, a securement panel 16 disposed in the passage, and a pair of sealing flanges 18 disposed on opposite ends of the body. The securement panel 16 is disposed inside the passage 14 and is disposed equidistant between the ends of the body 12. The body 12 and the sealing flanges 18 are like the previously described body A and sealing flanges C shown in FIGS. 10-12 and so will not be described in further detail.

The securement panel 16 has an outer perimeter wall that surrounds the entire securement panel. The outer perimeter wall extends along and is fixedly attached to the body roof, floor, and side walls. The securement panel is a generally planar member being disposed perpendicular to the longitudinal axis of the passage 18 that fully obstructs the passage 14.

Disposed in the securement panel 16 are three openings: a first circular through hole 20, a middle or second circular through hole 22, and a third circular through hole 24. In the illustrated embodiment the centers of the through holes are aligned coaxially with one another along an axis perpendicular to the longitudinal axis of the passage 14. Each opening is surrounded by a respective circular opening wall 26 that defines the opening and extends through the thickness of the securement panel. Each opening wall completely surrounds its respective opening, that is, the opening wall extends circumferentially a full 360 degrees around the opening to completely bound the opening. Extending radially from each opening wall into the opening are circumferentially spaced spring arms 28.

An MEP line (not shown) extending through the passage 14 must pass through one of the holes 20, 22, 24 of the securement panel 16. Each of the first hole 20, second hole 22, and third hole 24 is sized to receive a respective MEP line having a minimum sized MEP line that can deflect the spring arms 28 in the opening and a maximum sized MEP line essentially limited by the maximum diameter of the opening.

The illustrated first and third holes are configured for passage of 0.75-inch to 1-inch MEP lines, and the second hole is configured for passage of 1-inch to 1.5-inch conduit lines. However, securement panels can be configured to include openings sized to receive larger or smaller MEP lines (for example, MEP lines smaller than 1 inch, for example, 0.5 inches, or MEP lines larger than 1.5 inches, for example 3 inches).

When an MEP line extends through one of the openings, the opening wall 26 aligns the MEP line in the passage 14 and limits and resists movement of the MEP line towards the walls of the body 12.

Figure 3:
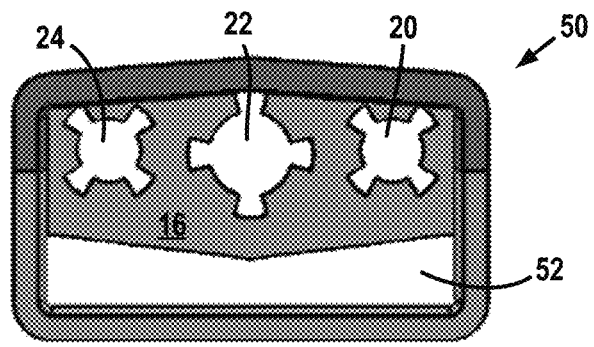
FIGS. 3 and 4 are end views similar to FIG. 2 of a second embodiment and third embodiment conduit guide respectively.

FIG. 3 illustrates a second embodiment conduit guide 50. In this embodiment the securement panel like the securement panel of the conduit guide 10 in being attached to the roof and side walls of the body but extends from the roof only partway to the floor. The securement panel does not completely obstruct the passage 14 but only partially obstructs the passage. The securement panel and the floor thereby define a gap 52 between them extending between the side walls of the body. The gap allows a chain to pass through the passage for securing the concrete beam carrying the conduit guide during shipment, or can be used for passage of MEP lines or other lines that do not need to be aligned or secured by passing them through the holes 20, 22, 24 after installation of the concrete beam.

Figure 4:
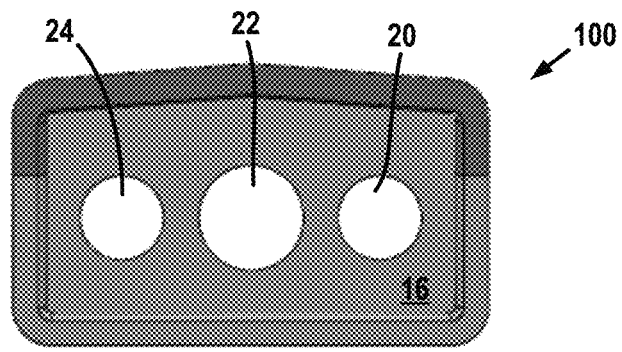

FIG. 4 illustrates a third embodiment conduit guide 100. In this embodiment the securement panel 16 is similar to the securement panel of the conduit guide 10 in having the securement panel attached to the roof, floor, and side walls of the body to fully obstruct the passage, and in having three openings: a first circular through hole 20, a second circular through hole 22, and a third circular through hole 24. The through holes are aligned in a row centered between the between the body roof and the body floor. In this embodiment the through holes do not include spring arms extending into the holes. The opening walls surrounding the holes resist movement of MEP lines extending through the holes towards the body as previously discussed.

Figure 5:
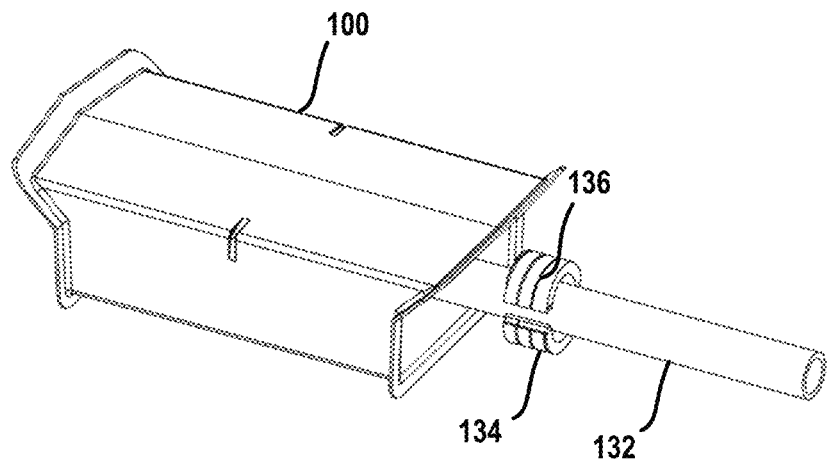
FIG. 5 is a view of an MEP line being installed in the conduit guide shown in FIG. 4.

FIG. 5 illustrates an MEP line 132 being fed through the through hole 22 of the conduit guide 100. The MEP line has essentially the same outer diameter as the diameter as the through hole. A tubular insert 134 is shown being placed on the MEP line; when installed the tubular insert fully surrounds the MEP line. The insert has a helical slot 136 formed on the outside of the insert. The slot near the axial ends of the insert are sized to be able to receive the thickness of the securement panel in the slot, and narrow towards the middle of the insert.

After the MEP line 32 is in place extending through the passage 14 and through hole 22, the insert 34 is slid along the MEP line and against the securement panel 16. The insert is then essentially threaded into the through hole to receive the opening wall 26 into the slot. Continued threading of the insert causes the opening wall to be tightly received into the slot, fixing the insert to the securement panel and compressing the insert against the MEP line. The insert then resists axial movement of the MEP line along the passage 14.

Figure 6:
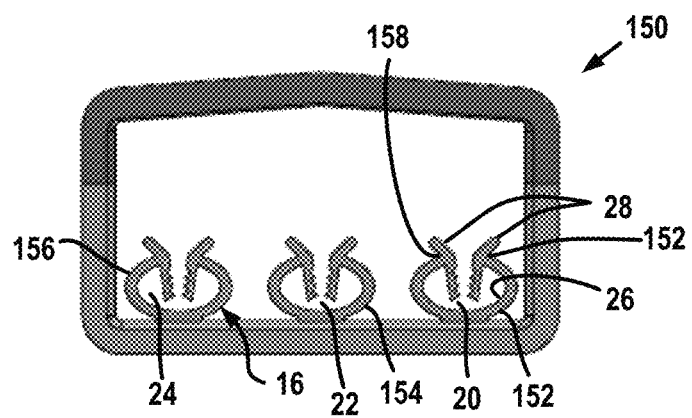
FIGS. 6, 7, 8, and 9 are end views similar to FIG. 2 of a fourth embodiment, fifth embodiment, sixth embodiment, and seventh embodiment conduit guide respectively.

FIG. 6 illustrates a fourth embodiment conduit guide 150. In this embodiment the securement panel 16 is formed as three like chairs: a first chair 152, a second chair 154, and a third chair 156. The chairs are spaced apart along the floor of the body and are permanently attached to the floor of the body.

Each chair 152, 154, 156 includes an elliptically shaped opening wall 26 that defines respective panel through holes 20, 22, and 26. The opening wall extending upwardly away from the floor and has opposed, spaced apart free ends 158. A pair of elongate serrated spring arms formed as fingers 28 are disposed on the free ends. Each panel opening is open to the passage between the free ends of the opening wall. The fingers extend upwardly from the wall opening and flare away from each other, and extend downwardly from the wall opening into the opening. The finger serrations are disposed in the opening.

In use an MEP line is passed through the conduit guide passage 14 and is then aligned to be received between the flared fingers 28 of a chair. The MEP line is then pulled downwardly towards the floor to move the MEP line into the chair opening, the fingers assisting in guiding the MEP line into the opening. The MEP line urges the fingers apart, the finger serrations pressing against the MEP line in the opening and resisting axial displacement of the MEP line relative to the chair.

The chairs enable a more blind placement of an MEP line through the passage as the MEP line in the passage can be placed over the chair. The chairs also leave room for passage of a chain or MEP lines or other items that do not require securement or alignment in the conduit guide.

Figure 7:
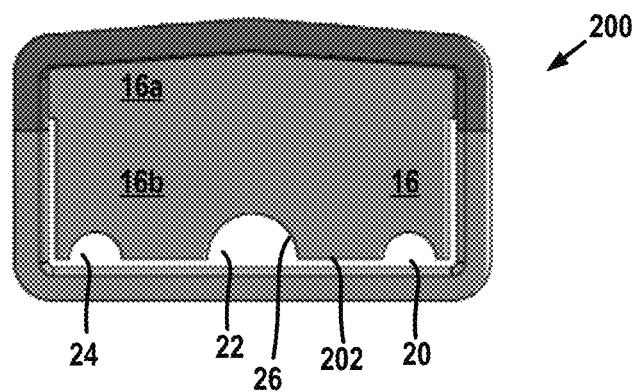

FIG. 7 illustrates a fifth embodiment conduit guide 200. In this embodiment the securement panel 16 is attached to the roof of the body and only along a relatively short portion of each side wall adjacent to the roof. The securement panel then includes a first panel portion 16a rigidly attached to the roof and side panels and a downwardly extending cantilevered second portion 16b that extends substantially the full width of the passage between the side walls and extends from the first portion to a free end 202 closely spaced from the floor of the body.

The second securement panel portion 16a includes three spaced-apart openings disposed along the free end: a first through hole 20, a second through hole 22, and a third free hole 24. In this embodiment the opening walls 26 that face the openings extend partially around the openings, that is, each opening wall extends circumferentially less than 360 degrees around its respective opening whereby each opening wall forms a portion of the outer periphery of the securement panel.

The openings 20, 22, 24 are each sized such that when an appropriately sized MEP line is pushed through an opening from one side of the securement panel 16, the second securement panel portion 16b deflects upwardly for passthrough of the MEP line. The opening wall 26 engages the MEP line and resists relative movement of the MEP line towards the roof and side walls of the body. The opening wall also applies a force generated by the securement panel deflection urging the MEP line against the floor and resisting axial displacement of the MEP line relative to the securement panel.

Figure 8:
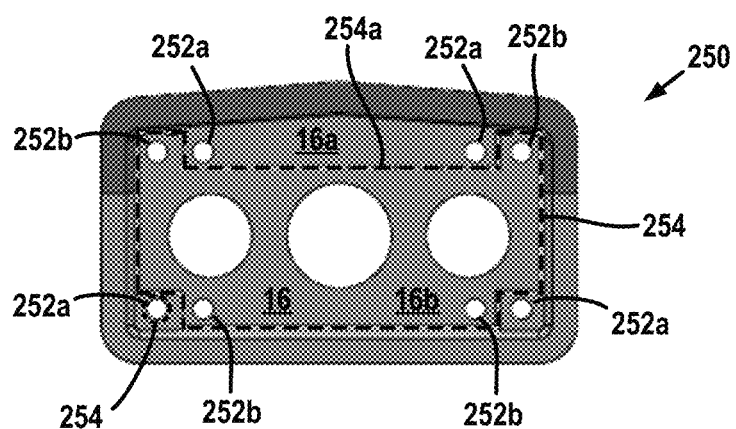

FIG. 8 illustrates a sixth embodiment conduit guide 250. The conduit guide includes a securement panel 16 similar to the securement panel of the third embodiment conduit guide 110 that obstructs the passage. The securement panel has a first panel portion 16a fixedly attached to the body walls and a second portion 16b that is foldable and removable with respect to the first panel portion. If the second portion is removed, panel pins refasten the second portion. The panel pins will pass through fastener through-openings 252a in the first panel portion and through fastener through-openings 252b in the second panel portion as will be described in more detail below.

The securement panel is formed with a "line of weakness" 254 (shown for clarity as a dashed black line in FIG. 8) forming the boundary of the first portion 16a and surrounding and defining the second portion 16b. The line of weakness may extend along an open or closed path formed by curved and/or straight segments. The illustrated line of weakness includes a fold line 254a adjacent to the roof, a pair of side lines adjacent to the side walls, and a bottom line adjacent to the floor.

If it is desired to pass a chain through the passage 14 for securing the concrete beam carrying the conduit guide during shipment, the securement panel 16 is cut along the pair of side lines and the bottom line so that only the fold line 254a connects the first panel portion 16a with the second securement panel portion 16b. The second panel portion is then folded along the fold line towards the roof to create a gap between the securement panel and the floor enabling the chain to pass through the passage.

After installation of the concrete beam, the securement panel 16 is cut along the fold line 254a to separate the second panel portion 16b from the first panel portion 16a. The second panel portion is then placed against the first panel portion with the second portion fastener openings 252b aligned with and overlying the first portion fastener openings 252a (the orientation of the second portion would be flipped and reversed from what is shown in FIG. 8 to overlay the fastener openings). Barbed push pins such as those used in the automotive industry for fastening panels together are passed through the pairs of aligned openings 252a, 252b to fixedly fasten the second securement panel portion 16b to the first securement panel portion 16a.

The conduit guide 250 can be initially provided with push pins (a head 254 of a push pin is shown in dashed lines FIG. 8) placed in the first portion fastener openings 252a. The second panel portion is aligned with and then pushed onto the push pins when re-fastening the second portion to the first portion.

Figure 9:
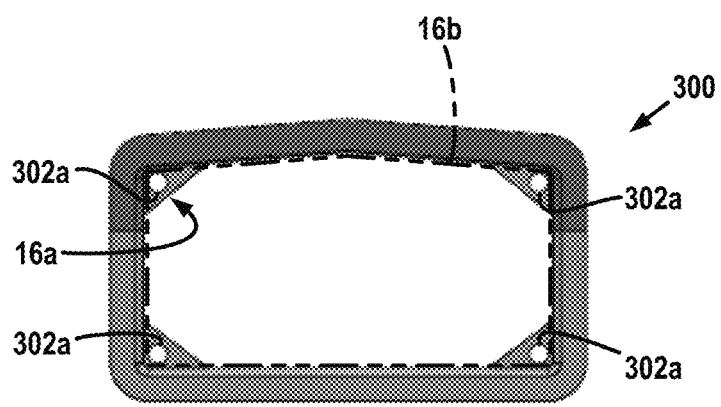
Figure 16:
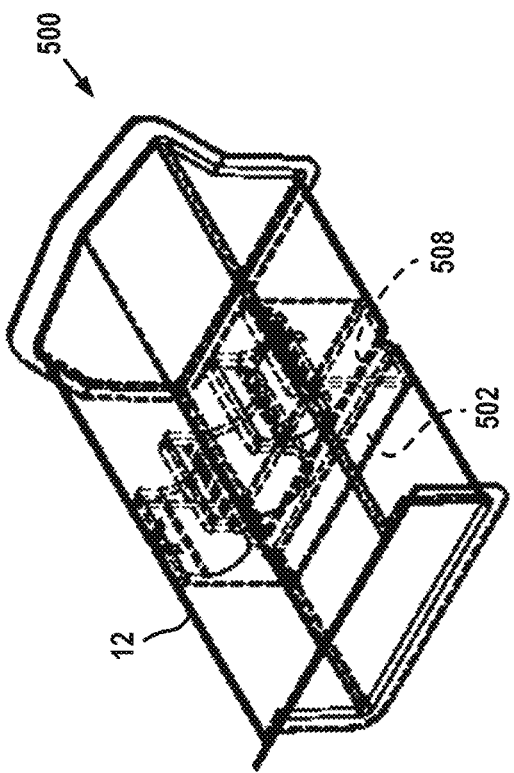
FIGS. 16-19 are a perspective view, a top view, an end view, and a side view respectively of an eighth embodiment conduit guide.
Figure 19:
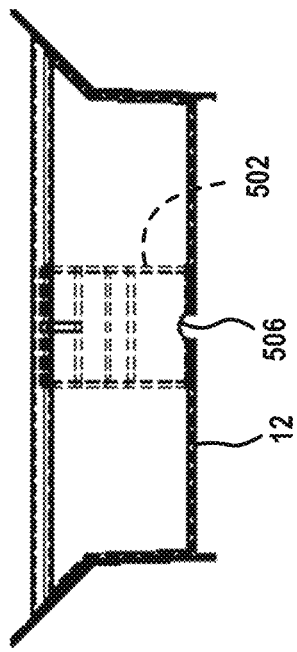
Figure 17:
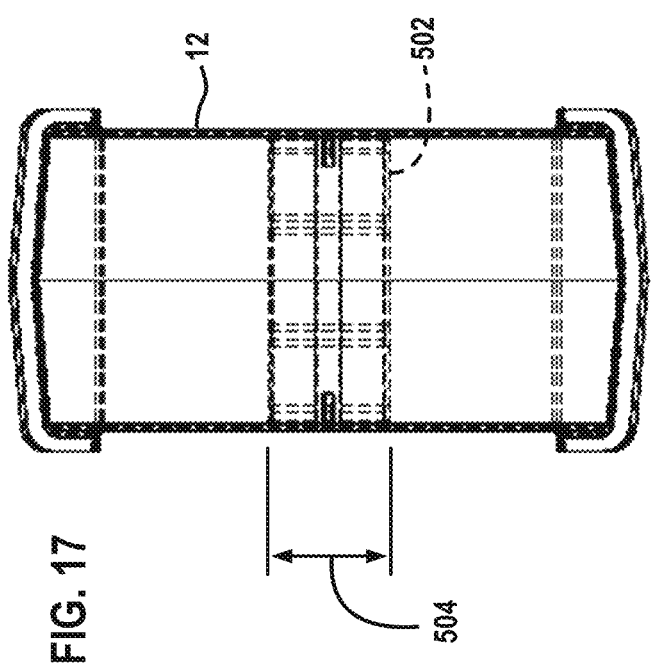

FIG. 9 illustrates a seventh embodiment conduit guide 300. This embodiment conduit guide is inspired by the conduit guide 250. The conduit guide is manufactured as two members: a first member with only a first securement panel portion 16a having fastener openings 302a, and a separate second panel portion such as the second panel portion 16b outlined in the figure. The second portion is attached to the first portion by barbed panel pins extending through aligned and overlying fastener openings to form the securement panel 16 as previously described. The second panel portion can be designed to cooperate with the first panel portion in forming a securement panel like those, for example, disclosed in the first five embodiments described above. A cantilevered second portion 16b can be attached to the first portion 16a using only a pair of push pins using the fastener openings adjacent to the roof to thereby enable deflection of the free end of the second portion 16b.

The conduit guide 300 with only the first securement portion can be cast in the concrete beam in the usual manner. The conduit guide can be used on site without installing the second securement portion if no securement or alignment features are required. Thus, an inventory of the conduit guides 300 can be maintained for both applications that require alignment/securement of the MEP lines on site and those applications that do not.

Like the conduit guide 250, the conduit guide can be initially inventoried and provided for use with push pins in the fastener openings.

FIGS. 10-15 illustrate different second panel portion embodiments wherein the second panel portion is mechanically attached to a first panel portion using mechanical engagement of parts and utilizing the inherent flexibility of the second panel portion.

FIGS. 10 and 11 illustrate a second panel portion 350 that includes a pair of elongate tabs 352, 354 disposed to extend along the top and bottom of the second panel portion respectively. The tabs are received in corresponding slots defined by the first panel portion (not shown) that extend along the roof and floor of the conduit guide body.

FIGS. 12 and 13 illustrate a second panel portion 400 that includes elongate slots 402, 404 extending along the top and bottom of the second panel portion respectively. The slots receive corresponding tabs (not shown) defined by the first panel portion that extend from the roof and floor of the conduit guide body.

FIGS. 14 and 15 illustrate a second panel portion 450 that includes a set of pins 452, 454 spaced apart along the top and bottom of the second panel portion respectively and extending away from the second panel portion. The pins are received in corresponding blind holes (not shown) formed in the first panel portion that extend from the roof and floor of the conduit guide body.

The second panel portions 350, 400, 450 can also in embodiments form the entire securement panel with an outer perimeter attached to the wall of the conduit guide body. The tabs, slots, or pins can engage cooperating slots, tabs, or blind holes formed in the body wall.

FIGS. 16-19 illustrate an eighth embodiment conduit guide 500 that includes a tubular body 12 and a securement panel 502. In this embodiment the securement panel is formed as a generally box-like member having a relatively substantial depth dimension 504 that extends parallel with the length of the body.

The floor of the tubular body 12 is formed with a rounded protuberance 506 midway between the sealing flanges that extends between the side walls of the body. The securement panel 502 includes a corresponding concavity or rounded peripheral recess 508 that receives the protuberance and cooperates with the protuberance in locating the securement panel in the body passage.

Figure 18:
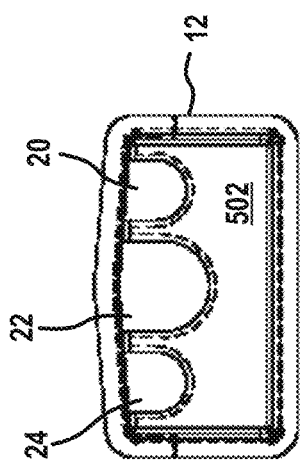
Figure 20:
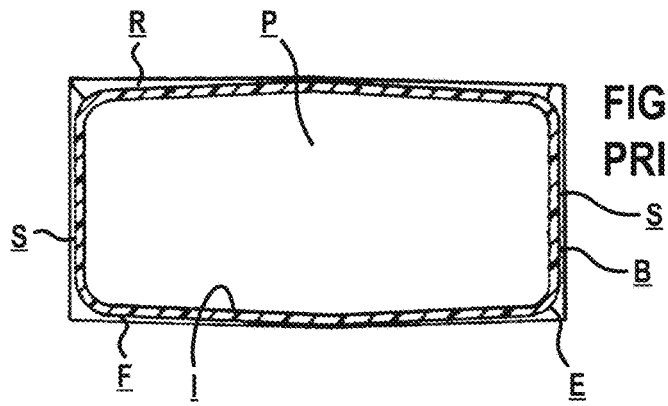
FIG. 20 is a sectional view of a prior art conduit guide taken along line 10-10 of FIG. 21.
Figure 22:
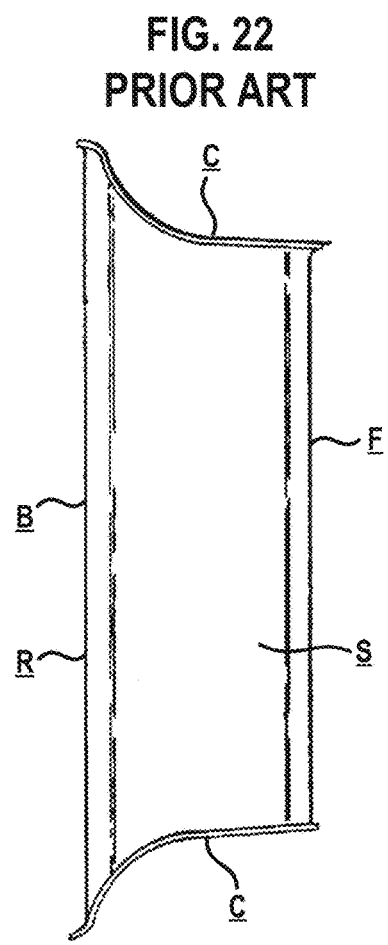
FIG. 22 is a side view of the conduit guide shown in FIG. 20.
Figure 21:
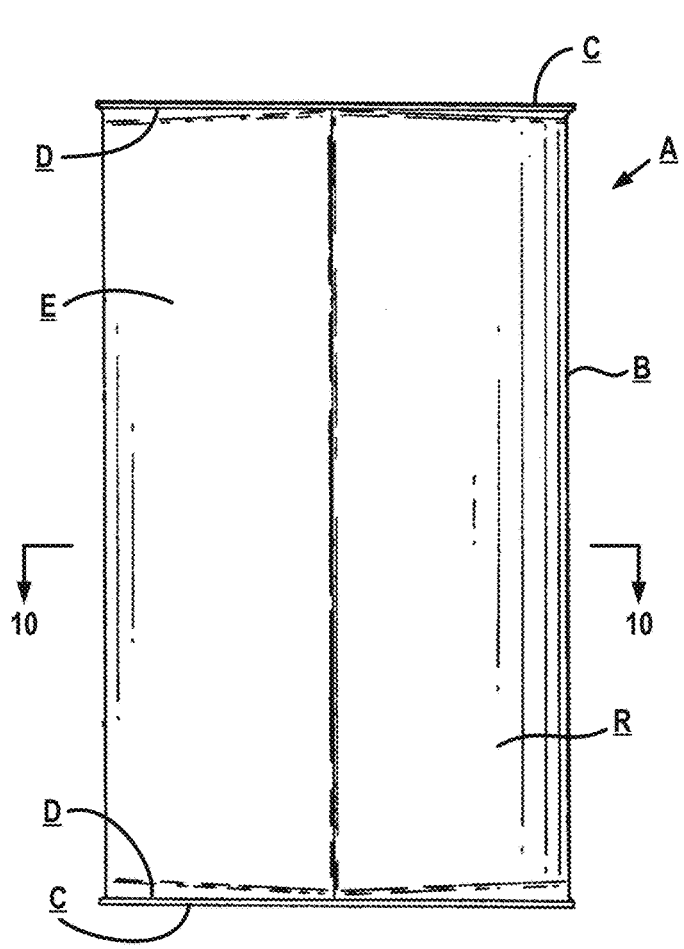
FIG. 21 is a top view of the conduit guide shown in FIG. 20.

The securement panel 502 is configured to be closely received in the body 12 as best seen in FIG. 18. The securement panel has three MEP openings 20, 22, 24 that cooperate with the roof of the body 12 to secure and align MEP lines extending through the openings.

In other embodiments of the conduit guide 250 or 300 the second securement panel portion can be attached to the first securement panel portion by other methods known in the art, including different types of fastener, mechanical engagement of interlocking parts (such as, for non-limiting examples, latch arms formed on one portion that latch to the other portion or as illustrated by the attachment configuration of the second panel portions 350, 400, 450), or adhesive.

The conduit guide 300 can be provided as a kit that includes the first member, the second panel portion (for non-limiting examples, second panel portions 350, 400, 450), and any necessary fasteners or adhesive. Fasteners in embodiments of the kit that require them can be provided pre-installed in the first or second panel portions.

The illustrated conduit guides 10, 50, 100, 150, 200, 250 are each manufactured as a one-piece homogeneous plastic member by injection molding, that is, formed from injection-moldable plastic. Conduit guides manufactured without a second panel portion, such as the conduit guide 300, also may have the conduit guide body and first attachment portion manufactured as a one-piece homogeneous plastic member by injection molding. With respect to the conduit guide 500, the tubular conduit guide body is manufactured as a one-piece homogeneous plastic member by injection molding.

The above discussion of the manufacturing of the illustrated conduit guides is not intended to be limiting; other methods of manufacturing and other materials can be used for manufacturing the conduit guide or components of the conduit guide in other embodiments.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in securement panel configuration (including the size, number, shape, location, and arrangement of openings), fasteners, material selection, body length and size, like), environment of use, and the like, as well as such changes and alterations that fall within the purview of the following claims.

What is claimed is:

1. A conduit guide for a concrete beam construction to enable an MEP line to pass through the concrete beam, the conduit guide comprising:

a body and a securement panel;

the body being a unitary one-piece member comprising a tubular wall and a pair of sealing flanges;

the tubular wall extending along an axis from a first end of the wall to an opposite second end of the wall, the wall without through-openings extending through the wall, the wall defining and surrounding a through passage extending from the first end to the second end, the wall comprising an inner surface facing and surrounding the passage and an outer surface surrounding the inner surface, the pair of sealing flanges being disposed on respective first and second ends of the wall, each flange surrounding the wall and extending from the outer surface of the wall away from the axis;

the securement panel being disposed inside the tubular wall, the securement panel extending along and being fixedly attached to at least a portion of the inner wall surface and extending from the said attachment to the inner wall surface into the passage to at least partially obstructing the passage, the securement panel comprising a through opening aligned with the passage to receive an MEP line extending through the securement panel.

2. The conduit guide of claim 1 wherein the through opening is sized to receive an MEP line having a maximum diameter of between 0.75 inches and 3 inches inclusive.

3. The conduit guide of claim 1 wherein the body and the securement panel are portions of a unitary one-piece homogenous member.

4. The conduit guide of claim 3 wherein the member is formed of an injection-moldable plastic.

5. The conduit guide of claim 1 wherein the security panel comprises a first portion and a second portion, the second portion a separate member from the first portion, the first portion extending from the inner wall surface, the second portion fastened to the first portion whereby the first and second portions cooperatively define the securement panel.

6. The conduit guide of claim 5 wherein the second portion is attached to the first portion by at least one of: mechanical fasteners, interlocking members formed on the first and second portions, or adhesive.

7. The conduit guide of claim 1 wherein the securement panel comprises a circumferential opening wall completely surrounding the opening.

8. The conduit guide of claim 1 wherein the securement panel comprises a circumferential opening wall partially surrounding the opening and extending along an outer perimeter of the securement panel.

9. The conduit guide of claim 8 wherein the opening is disposed on a free end of the securement panel.

10. The conduit guide of claim 1 wherein the securement panel comprises a first portion comprising an outer periphery fixedly attached to the inner wall surface and a second portion extending from the first portion into the passage, the second portion comprising a free end spaced from and not attached to the inner wall surface.

11. The conduit guide of claim 1 wherein the securement panel comprises a chair attached to the body wall, the chair comprising a wall extending from the attachment to the body wall into the passage to a pair of spaced-apart free ends in the passage, the securement panel wall defining the opening, the free ends defining a gap therebetween whereby the securement panel wall partially surrounds the opening.

12. The conduit guide of claim 11 wherein the chair comprises a finger attached to each respective free end of the chair, each finger comprising a first finger portion extending from the respective free end into the opening and a second finger portion extending away from the first finger portion into the passage.

13. The conduit guide of claim 12 wherein the first finger portions are serrated.

14. The conduit guide of claim 1 wherein the securement panel comprises an outer perimeter surrounding the securement panel, the securement panel being attached to the inner wall surface along the entire outer perimeter whereby the securement panel extends across the entire passage.

15. The conduit guide of claim 14 wherein the securement panel comprises a line of weakness dividing the securement panel into first and second portions, the line of weakness surrounding the second portion, the line of weakness being configured to facilitate separating the second portion from the first portion.

16. The conduit guide of claim 15 wherein the line of weakness comprises a line portion that enables folding of the first portion towards the inner wall surface prior to separating the second portion from the first portion.

17. The conduit guide of claim 15 wherein the first and second securement panel portions each comprise fastener openings, the second panel portion when separated from the first panel portion capable of being oriented with the first panel portion wherein respective pairs of fastener openings are aligned with one another to pass fasteners therethrough fastening together the first and second panel portions.

18. The conduit guide of claim 1 wherein the opening is one of a plurality of spaced-apart openings in the securement panel, each of the plurality of openings being configured to receive a respective MEP line extending through the passage.

19. The conduit guide of claim 18 wherein at least two of the openings differ in size from one another.

20. The conduit guide of claim 1 wherein the securement panel comprises one or more arms extending into the opening.

21. The conduit of claim 1 wherein the tubular wall defines a protuberance that is received in a concavity of the securement panel.

22. A conduit guide kit for assembling a conduit guide, the conduit guide kit comprising:

a first member and a second member;

the first member comprising a body and a first portion of a securement panel;

the body being a unitary one-piece member comprising a tubular wall and a pair of sealing flanges;

the tubular wall being an unbroken tubular wall without through-openings extending through the wall, the wall extending along an axis from a first end of the wall to an axially opposite second end of the wall, the wall defining and surrounding a through passage extending from the first end to the second end, the wall comprising an inner surface facing and surrounding the passage and an outer surface surrounding the inner surface, the pair of sealing flanges being disposed on respective first and second ends of the wall, each flange surrounding the wall and extending from the outer surface of the wall away from the axis;

the first portion of the securement panel being disposed inside the tubular wall and fixedly attached to at least a portion of the inner wall surface and extending from the said attachment into the passage and partially obstructing the passage;

the second member being configured to be attached to the first portion of the securement panel, the second member and the first portion of the securement panel cooperatively forming a securement panel being disposed in the passage and at least partially obstructing the passage when the second member is attached to the first portion of the securement panel; and the securement panel when formed comprising a through opening aligned with the passage to receive an MEP line extending through the securement panel.

23. The conduit guide kit of claim 22 comprising one or more mechanical fasteners capable of attaching the second member to the first portion of the securement panel.

24. The conduit guide kit of claim 23 wherein the first member is a unitary one-piece homogeneous member formed from injection-moldable plastic.

* * * * *